May 22, 1951    J. W. WANDELL    2,554,161
METHOD OF DRYING UREA-ALDEHYDE REACTION MASSES
CONTAINING CLAY AS A FILLER
Filed Feb. 20, 1946
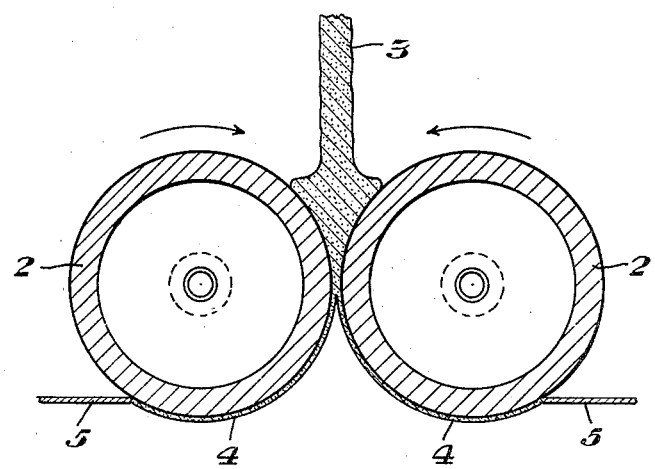
INVENTOR
James W. Wandell
by
Stebbins, Blenko & Webb.
Attys.

Patented May 22, 1951

2,554,161

UNITED STATES PATENT OFFICE 2,554,161

METHOD OF DRYING UREA-ALDEHYDE REACTION MASSES CONTAINING CLAY AS A FILLER

James W. Wandell, New York, N. Y., assignor to Wandell Associates, Inc., New York, N. Y., a corporation of New York Application February 20, 1946, Serial No. 649,054

7 Claims. (Cl. 34—39)

This invention relates to a method of drying urea-aldehyde reaction masses containing clay as a filler to produce a thermosetting molding compound for hot compression molding.

In making urea-formaldehyde molding compounds for hot compression molding, it has been customary in the past to react urea and formaldehyde and then dry the reaction mass by pouring it into shallow trays and heating under vacuum at a temperature of about 122° F. for at least 5 hours, sometimes for as long as 24 to 72 hours. Such method has not proved entirely satisfactory where the urea-formaldehyde reaction mass has incorporated in it a large percentage of clay as a filler. By my process, hereinafter described in detail, I am able to dry a urea-formaldehyde reaction mass containing large percentages, i. e., 50 to 80% by weight of clay as a filler, so as to produce a molding compound for hot compression molding which contains as little as 1% of moisture, or an even lower quantity of moisture and which is eminently suited for hot compression molding. In carrying out my drying method, I provide a urea-formaldehyde-clay reaction mass of proper consistency and contact the mass with one or more heated surfaces maintained at a relatively high temperature, the contact of the mass with the heated surfaces being for only a very brief interval of time. In the preferred embodiment of my invention, I pass the mass having proper viscosity between and in contact with two heated rolls, the temperature of the rolls being maintained within certain limits, the time of contact with the heated rolls being rigidly controlled and the rolls being spaced apart an accurately controlled distance so as to form a layer of accurately controlled thickness. A very superior molding compound is thereby produced.

The accompanying drawing illustrates in a somewhat diagrammatic manner an arrangement of two heated rotating rolls between which the urea-aldehyde-clay reaction mass is passed to dry it.

Referring to the drawing, the reference numeral 2 designates two rotating chrome plated steel rolls which are heated by steam or other suitable heating means to a temperature between 225° F. and 310° F. These rolls are spaced apart a controlled distance. The urea-formaldehyde-clay reaction mass which is to be dried is poured in a stream 3 between and in contact with the rolls. Water is removed and a layer 4 of molding compound is formed on each of the rolls. The layers 4 are removed from the rolls by contact with suitably disposed scrapers 5. The product removed by the scrapers is in the form of flakes and may be used as such as a molding compound or may be ground to a powder of desired particle size. The whole device shown in the drawing may be enclosed in a housing and the housing maintained under vacuum in order to aid in the removal of water from the mass.

While the method of drying herein described is applicable to the treatment of a wide variety of urea-formaldehyde-clay reaction masses, one example of the formation of such reaction mass is as follows: 29.20 grams of urea, 10.8 grams of formaldehyde and 0.6 gram of barium hydroxide are mixed and 40 grams of water containing 2 grams of emulsified stearate are added. The solution is held at 80° F. for fifteen minutes during which time the clay filler is added and mixed with the other ingredients. The reaction mass contains approximately 50% by weight of water. The reaction mass is then dried by passing it between and in contact with rotating heated rolls as shown in the drawing.

The consistency of the reaction mass which is passed between and in contact with the heated rolls is an important consideration with respect to the quality of the molding compound which is produced. If the mass is too fluid the molding compound after drying is in the form of a powder which is too fine for satisfactory use in hot compression molding. Furthermore if the mass is too fluid, there is danger of the compound setting during drying and therefore being unsuitable for use as a molding compound. Also where the mass is too fluid, the amount of reaction mass which can be dried in a given time is materially decreased. On the other hand if the reaction mass is too viscous the product cannot be dried to the desired extent without danger of deleteriously affecting some of the product. In order to produce a satisfactory molding compound, I have found that the water should constitute between 30 and 55% by weight of the mass and that it should preferably be between 40 and 50%.

The temperature of the heating rolls should be maintained between about 225° F. and 310° F. in order to produce a satisfactory molding compound. The preferred range of temperature is between about 275° F. and 305° F., the preferred temperature being about 290° F.

My drying method is characterized by very rapid drying at a relatively high temperature. The mass should not remain in contact with the heated rolls for over thirty seconds. In most instances, the time of contact should be not less than five seconds, the preferred time in contact being between five and fifteen seconds.

The distance that the heated rolls 2 are spaced apart is extremely important and critical. I have found that this distance should not be less than 0.015 inch nor greater than 0.030 inch or 0.035 inch. The preferred spacing of the rolls is about 0.020 inch. When the rolls are spaced apart a distance greater than 0.035 inch, satisfactory drying is not accomplished within the preferred time of contact and where the distance between the rolls is less than 0.015 inch the layer of reaction mass formed on the rolls is so thin that it will set up and will result in a fine powder when scraped off the rolls, such fine powder not being satisfactory as a molding compound.

The amount of clay in the reaction mass which is to be dried preferably is such that, after drying, a molding compound containing from 50 to 80% by weight of clay is produced. It is preferred that the pH of the clay used as a filler be about 4 to 7 and that the clay contain about 40 to 50% by weight of $SiO_2$ and 40 to 50% by weight of $Al_2O_3$.

The water content of the reaction mass, the temperature of the heated rolls, the time in contact with the rolls and the thickness of the layer of reaction mass in contact with the heated rolls all must be maintained within the ranges specified if the highest quality molding compound is to be produced. The thickness of the layer in contact with the heated rolls is particularly important, it being noted that the total range of thickness constitutes only 0.020 inch, i. e., from 0.015 inch to 0.035 inch.

While it is preferred that the drying be accomplished by passing the reaction between and in contact with heated rotating rolls, the drying may be accomplished, although less satisfactorily, by pouring the mass onto a stationary heated surface provided the conditions with respect to thickness of layer be dried, time in contact with the heated surface, temperature of the heated surface and water content of the mass are followed.

The invention is not limited to the preferred conditions but may be otherwise embodied or practiced within the scope of the following claims.

I claim:

1. The method of drying a urea-aldehyde reaction mass containing clay as a filler to produce a thermosetting molding compound for hot compression molding, which comprises providing said mass containing about 30 to 55% by weight of water, forming the mass into a layer having a thickness between 0.015 and 0.035 inch and contacting each side of the layer with a heated surface maintained at a temperature of about 225° F.–310° F. for a period of between about 5 to 30 seconds.

2. The method of drying a urea-aldehyde reaction mass containing clay as a filler to produce a thermosetting molding compound for hot compression molding, which comprises providing said mass containing about 30 to 55% by weight of water, and passing the mass in a layer having a thickness of 0.015–0.035 inch between and in contact with rotating rolls maintained at a temperature of 225° F.–310° F. for a period of between about 5 to 30 seconds.

3. The method of drying a urea-aldehyde reaction mass containing clay as a filler to produce a thermosetting molding compound for hot compression molding, which comprises providing said mass containing about 40 to 50% by weight of water and passing the mass in a layer having a thickness of 0.015–0.035 inch between and in contact with rotating rolls maintained at a temperature of about 275° F.–305° F. for a period of 5 to 15 seconds.

4. The method of drying a urea-aldehyde reaction mass containing clay as a filler to produce a thermosetting molding compound for hot compression molding, which comprises providing said mass containing about 30 to 55% by weight of water, said mass containing clay in amount to give after drying a molding composition containing 50 to 80% by weight of clay, and passing the mass between and in contact with rotating rolls spaced about 0.015–0.035 inch apart and maintained at a temperature of 225° F.–310° F. for a period of between about 5 to 30 seconds.

5. The method of drying a urea-aldehyde reaction mass containing clay as a filler to produce a thermosetting molding compound for hot compression molding, which comprises providing said mass containing about 30 to 55% by weight of water, said mass containing clay in amount to give after drying a molding composition containing 50 to 80% by weight of clay, the clay having a pH of about 4 to 7, and passing the mass between and in contact with rotating rolls spaced about 0.015–0.035 inch apart and maintained at a temperature of about 225° F.–310° F. for a period of between about 5 to 30 seconds.

6. The method of drying a urea-aldehyde reaction mass containing clay as a filler to produce a thermosetting molding compound for hot compression molding, which comprises providing said mass containing about 30 to 55% by weight of water, said mass containing clay in amount to give after drying a molding composition containing 50 to 80% by weight of clay, the clay containing $SiO_2$ and $Al_2O_3$ in about equal proportions by weight, and passing the mass between and in contact with rotating rolls spaced about 0.015–0.035 inch apart and maintained at a temperature of 225° F.–310° F. for a period of between about 5 to 30 seconds.

7. The method of drying a urea-aldehyde reaction mass containing clay as a filler to produce a thermosetting molding compound for hot compression molding, which comprises providing said mass containing about 30 to 55% by weight of water, said mass containing clay in amount to give after drying a molding composition containing 50 to 80% by weight of clay, the clay having a pH of about 4 to 7 and containing about 40 to 50% by weight of $SiO_2$ and about 40 to 50% by weight of $Al_2O_3$, and passing the mass between and in contact with rotating rolls spaced about 0.015–0.035 inch apart and maintained at a temperature of 225° F.–310° F. for a period of between about 5 to 30 seconds.

JAMES W. WANDELL.

REFERENCES CITED

The following references are of record in the file of this patent:

UNITED STATES PATENTS

| Number    | Name      | Date           |
|-----------|-----------|----------------|
| 2,056,458 | Howald    | Oct. 6, 1936   |
| 2,197,357 | Widmer    | Apr. 16, 1940  |
| 2,250,773 | Overton   | July 29, 1941  |
| 2,259,606 | Beardslee | Oct. 21, 1941  |
| 2,281,811 | Towner    | May 5, 1942    |

OTHER REFERENCES

Buflovak Drum Dryers for chemicals, food products, pharmaceuticals; published by Buffalo Foundry & Machine Co., Buffalo, N. Y. (Bulletin #285); Copyright 1935 (24 pages, pages 3–6 are noted).